United States Patent [19]

Caporiccio et al.

[11] Patent Number: 4,788,257

[45] Date of Patent: Nov. 29, 1988

[54] PROCESS FOR PREPARING REGULATED MOLECULAR WEIGHT PERFLUORO-POLYETHERS HAVING NEUTRAL AND FUNCTIONAL END GROUPS

[75] Inventors: Gerardo Caporiccio, Milan; Gian T. Viola, Cervia; Giuseppe Marchionni, Milan; Pio De Iorio, Milan; Adriana Tasca, Milan, all of Italy

[73] Assignee: Montedison S.p.A., Milan, Italy

[21] Appl. No.: 929,832

[22] Filed: Nov. 13, 1986

[30] Foreign Application Priority Data

Nov. 19, 1985 [IT] Italy ............................... 22902 A/85
Nov. 20, 1985 [IT] Italy ............................... 22922 A/85

[51] Int. Cl.⁴ ..................... C07C 51/58; C07C 49/04; C08G 65/32
[52] U.S. Cl. .................................... 525/403; 568/615; 260/544 F; 562/586; 528/485
[58] Field of Search ....................... 525/403; 568/615; 260/544 F; 562/586; 528/485

[56] References Cited

U.S. PATENT DOCUMENTS 2,854,490  9/1958  Fischer et al. ..................... 528/485
3,847,978  11/1974  Sianesi et al. ..................... 568/615

Primary Examiner—Harold D. Anderson
Assistant Examiner—Dennis R. Daley
Attorney, Agent, or Firm—Stevens, Davis, Miller & Mosher

[57] ABSTRACT

A process for the dissociation of high molecular weight perfluoropolyethers to obtain low molecular weight perfluoropolyethers which comprises treating a perfluoropolyether with 0.1–10% by weight of a catalyst consisting of Ti, Cr, Mn, Fe, Co, Ni, V, Cu, Mo, Sn, Sb, Zr, Zn oxides at temperatures comprised between 150° and 380° C.

6 Claims, No Drawings

PROCESS FOR PREPARING REGULATED MOLECULAR WEIGHT PERFLUORO-POLYETHERS HAVING NEUTRAL AND FUNCTIONAL END GROUPS

BACKGROUND OF THE INVENTION

1. Field of the Invention.

The invention relates to the preparation of low molecular weight perfluoropolyethers by a process for the dissociation of high molecular weight perfluoropolyethers obtained from photochemical oxidation processes of perfluoroolefins or by anionic polymerization of their epoxides.

2. The Prior Art.

It is known how to prepare perfluoropolyethers which are stable at ambient temperature and are obtained from perfluoropolyperoxides as are described respectively for example in British patent Nos. 1,226,566 and 1,104,482.

By using perfluoropropene as a starting product it is possible to obtain compounds which, after thermal or photochemical reduction of the peroxy precursor, have general formula:

$$A-O(-CF_2-CF(CF_3)-O)_m-(CF_2O)_n-(CFO)_r-Z \quad (I)$$
$$\phantom{A-O(-CF_2-CF(CF_3)-O)_m-(CF_2O)_n-(}CF_3$$

where A is an end group of neutral nature of the type: $-CF_3$, $-C_2F_5$, $-C_3F_7$ and Z is an acid group $$-C\overset{O}{\underset{F}{\diagup\!\!\!\diagdown}}, \text{ or } -CF(CF_3)-COF, \text{ or } -CF_2COF$$

or a derivative thereof or a group $-CO-CF_3$. The monomeric units with indexes m, n and r are statistically distributed along the chain, the values of indexes m, n, r vary from 0 to 200 (their sum being always higher than zero) and depend on the photo-oxidation reaction parameters.

By neutralization of the compounds of formula (I) by treatment with gaseous fluorine at temperatures ranging from 100° to 200° C., the corresponding neutral products are obtained wherein Z is converted into a group A' having the same meaning as A.

By using tetrafluoroethylene as a starting product there are obtained perfluoropolyethers which, after thermal or photochemical reduction of the peroxy precursor, have general formula:

$$Z'-O-(CF_2CF_2O)_p-(CF_2O)_q-Z \quad (II)$$

wherein Z and Z' are acid groups $$-C\overset{O}{\underset{F}{\diagup\!\!\!\diagdown}},$$

or $-CF_2COF$ or derivatives thereof, or $-CF_3, -C_2F_5$, monomeric units p and q are statistically distributed along the chain, the values of the indexes are such that the p/q ratio ranges from 0.5 to 2 and they depend on the photo-oxidation reaction parameters.

By neutralization with fluorine—as already indicated for the compounds of formula (I)—there are obtained corresponding neutral products in which Z' and Z, like or unlike each other, are $-CF_3$ or $-C_2F_5$.

Finally, there are also known perfluoropolyethers prepared by polymerization, in the presence of anionic catalysts, of the perfluoropropene epoxide, as is described e.g. in U.S. Pat. No. 3,250,808. The general formula attributable to these products is:

$$CF_3CF_2CF_2O-(CF(CF_3)-CF_2O)_s-Y \quad (III)$$

wherein Y is an acyl fluoride group $$-CF(CF_3)-C\overset{O}{\underset{F}{\diagup\!\!\!\diagdown}}$$

and s is an integer higher than zero.

By neutralization with fluorine there are obtained neutral compounds wherein Y is $-C_2F_5$.

The processes for the preparation of such perfluoropolyethers lead to a distribution of the product molecular weights which tends towards the high molecular weights for which it is difficult to find practical appliances.

The preceding Italian patent applications 21051 A/84 and 21052 A/84 filed by the Applicant disclosed a process for the dissociation of high molecular weight perfluoropolyethers by dissociation in the presence of Al, Ti, V, Co, Ni fluorides or oxyfluorides, at temperatures ranging from 150° C. to 380° C.

Such treatments permits to obtain perfluoropolyethers having a lower and regulated molecular weight, which are the products most utilizable in practice. It is well known that the low molecular weight products are used as operative and testing fluids in electronics. The mean molecular weight products are utilized as operative fluids in the vacuum sector.

THE PRESENT INVENTION

It has now surprisingly been found that it is possible to carry out such dissociation process by using catalysts different from the ones indicated in the abovesaid patent applications.

Thus, it is an object of the present invention to provide a process for the dissociation of perfluoropolyethers of formulas I, II, III having neutral end groups, carried out at temperatures ranging from 150° to 380° C. in the presence of a catalysts in amounts comprised between 0.1 and 10% by weight referred to the starting perfluoropolyether, comprising:

oxides of the following metals:

Ti, Cr, Mn, Fe, Co, Ni, V, Cu, Mo, Sn, Sb, Zr, Zn, fluorides and oxyfluorides of:

Cr, Mn, Fe, Cu, Mo, Sn, Sb, Zr, Zn.

The fluorides and the oxyfluorides are also preparable in situ starting from the halides (different from the fluorides) and operating in the presence of fluorine.

By varying temperature, time, catalyst amount and catalyst type it is possible to obtain perfluoropolyethers having a lower molecular weight than the starting ones and having the desired molecular weight.

As already indicated before, it is preferable to use, as starting perfluoropolyethers, the products of formulas (I), (II), (III) having neutral end groups; however, it is possible to utilize also the perfluoropolyethers containing acid and/or ketonic end groups of formulas (I), (II), (III).

In this case, higher catalyst amounts are to be used; the catalyst is preferably added when the perfluoropolyether has already reached the treatment temperature, and it is operated for longer times.

Also mixtures of the cited catalysts are useful.

In the presence of the abovesaid catalysts, the dissociation of the perfluoropolyethereal chain occurs independently of the monomeric structural sequences which are present in the chain, with formation of shorter chains having end groups of the type:

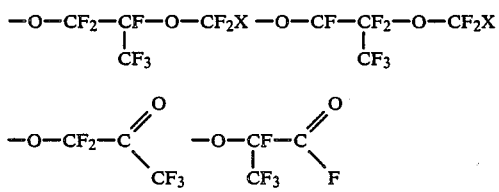

wherein $X=-F, -CF_3, C_2F_5$ when the starting perfluoropolyether derives from $C_3F_6$; when the perfluoropolyether derives from $C_2F_4$, the end groups obtained are of the type:

A particularly advantageous embodiment of the present invention consists in combining the chemical scission treatment with a fractionation treatment, for example by means of distillation or flash separation or molecular distillation of the dissociation product, such treatment being carried out immediately after dissociation or contemporaneously with it.

In the former case, the operative conditions during the dissociation step shall be controlled in such manner as not to have a too high dissociation degree in order to prevent a considerable formation of products having a too low molecular weight. The dissociation product, either as a liquid or as a vapour, is then subjected to a fractionation step, for example by means of distillation or of the above-cited methods, during which step the products having the desired mean molecular weight are separated, while the tail fraction, consisting of products still having a too high molecular weight, is recycled to the dissociation reactor. The process is preferably conducted continuously, whereby obtaining a product with a low dispersion index for every desired mean molecular weight.

In the latter case, in the reactor it is operated at such a temperature and a pressure that the reacting mixtures is kept boiling, and the distillate is subjected to distillation in a column in order to obtain at the top the products having a sufficiently low molecular weight, i.e. not exceeding the predetermined value, while the products with too high molecular weights are continuously recycled to the dissociation reactor.

In this way, the light products are removed at once from the reacting mixture, so preventing their further dissociation, which would give rise to products with a lower molecular weight than the one to be obtained, to low-boiling products, to losses.

Both operative methods are suited to provide, with high yields, fractions having the desired mean molecular weight and a narrow distribution of the molecular weight, while obtaining a high dissociation degree of the high molecular weight products and at the same time avoiding, or reducing to the minimum, a dissociation of the products already having the desired molecular weight.

It has been found that the specific process wherein during the chemical scission treatment the products having a sufficiently low molecular weight are continuously separated from the reaction mixture can be applied advantageously also to the chemical scission treatments described in the above mentioned Italian patent application 21052 A/84. Some examples show this particular embodiment by using the catalysts for the scission described in Italian patent application 21052 A/84.

The same however is true with the catalysts used for the scission in the present invention.

The following examples are illustrative but not limitative of the present invention.

EXAMPLE 1

500 g of perfluoropolyether (PFPE) prepared by photooxydation of $C_2F_4$ and subsequently subjected to thermal reduction of the peroxy content and to neutralization with elemental fluorine, having a mean molecular weight (MW) equal to 10,250 a.m.u., were introduced into a 1200 cc reactor equipped with stirrer, reflux cooler, $CO_2$ trap and electrically heated. After addition of 10 g of $TiO_2$, the temperature was brought to 200° C. and the whole was allowed to react for 30 minutes. At the end of the reaction and after filtration there were obtained 401 g of PFPE having a molecular weight of 3550 a.m.u. and an acidity equal to 0.3 meq KOH/g.

EXAMPLE 2

Using the same equipment of the preceding example, 20 g of titanium dioxide were added to 500 g of perfluoropolyether obtained by photo-oxidation of $C_2F_4$ and subsequent reduction and fluorination, as described in example 1, having a MW equal to 15,000 a:m.u.

The reaction was conducted at 220° C. for 40 minutes operating as in example 1. 202 g of perfluoropolyether having a MW equal to 3500 a:m.u. were obtained. 200 g of perfluoropolyether with a MW of 1500 a:m.u. were collected in the $CO_2$ trap.

EXAMPLE 3

Into a nickel reactor equipped with a stirrer, heating elements and a bubbler there were introduced 1000 g of neutral and non-peroxy PFPE, obtained from $C_2F_4$, having a MW equal to 10,250 a.m.u., along with 10 g of a mixture of $FeCl_2$, $CoCl_2$, $CrCl_3$, in a ratio of 3:1:1.

After flushing of the reactor with $N_2$ (10 l/h), the temperature was brought to 180° C., whereafter $N_2$ was substituted by gaseous fluorine (10 l/h). After a 5-hour reaction there were obtained 900 g of a partially acid PFPE (0.02 meq KOH/g) having a MW equal to 8,500 a.m.u. The product so obtained was subjected, after filtration, to neutralization by treating it with a fluorine stream (10 l/h) for 5 hours at 200° C. in a glass reactor. The resulting product was completely neutral and had a mean molecular weight of 8,500.

EXAMPLE 4

To a reactor having a 4-liter reaction volume and with an AlF$_3$ concentration equal to 0.3% by weight there was fed a perfluoropolyether (type Fomblin Y ® Montedison stream equal to 0.5 kg/h having a kinematic viscosity of 325 cSt at 20° C. The temperature in the reactor was maintained at about 280° C. It was operated at atmospheric pressure. The feed for the separation section, consisting of a flash chamber, was drawn in the liquid phase from the reactor. Pressure and temperature in the flash chamber were maintained at 1 mbar and 285° C. respectively.

The distilled and condensed stream had a viscosity equal to 93 cSt. The distilled fraction yield was equal to 88%. The residue was continuously recycled to the reactor; it resulted to be equal to about 10 kg/h, with a ratio between fed stream and stream recycled to the reactor equal to about 20. As distillation by-products there were obtained an uncondensable gas and low-boiling products.

The distilled product was then subjected to a discontinuous distillation.

The fractions indicated in Table 1 were obtained. The standard deviation of the distribution of the viscosity natural logarithms was equal to 1.19.

EXAMPLE 5—Comparative test

A discontinuous test was carried out in a reaction volume equal to 0.9 liters, having a mean AlF$_3$ concentration equal to 0.3% by weight. The product charged into the reactor was the same product utilized in example 4. The conditions in the reactor were as follows: atmospherical pressure and a temperature of 280° C.

The test was carried out for a time sufficient to obtain a product having a viscosity equal to 93 cSt. The yield was of 83%, the remaining portion being composed of uncondensable and low-boiling gases. The resulting product was then subjected to a discontinuous distillation using the same apparatus and following operative modalities analogous with those of example 4. Obtained were six fractions. Yields and viscosities of the fractions obtained are reported in Table 1. The standard deviation of the distribution of the natural logarithms of viscosities resulted to be equal to 1.65. A comparison between example 4 and comparative example 5 proves that the molecular weight distribution is narrower when, according to the invention, it is operated continuously and recycling the high molecular weight products.

EXAMPLE 6

1.000 g of perfluoropolyether type Fomblin Y produced by Montedison, having a mean molecular weight equal to about 4,500, were charged into a glass reactor of 2-liter volume and equipped with a glass distillation column (theoretical plates number: 8). To the perfluoropolyether charge, AlF$_3$ was added in an amount equal to 0.5% by weight referred to the perfluoropolyether. The whole was brought to a reaction temperature of 300° C. and the abovesaid perfluoropolyether begun to be continuously fed at a flowrate of 510 g/h. The mixture of volatile products generated by the reacting mass passed directly to the fractionation column, where a reflux ratio of 3:1 was maintained. The temperature at the top of the column was maintained at 200° C. A distillate having a mean molecular weight equal to 1100 and a dispersion index of 1.51, in an amount corresponding to 75% of the fed product, was so obtained. Low-boiling products and uncondensable gases were obtained as distillation by-products. It was operated continuously during 24 hours without varying the operative conditions.

TABLE 1

| Example 4 | | Example 5 (comparative) | |
|---|---|---|---|
| $\eta$(cSt) | % by wt. ($\omega_i$) | $\eta$(cSt) | % by wt ($\omega_i$) |
| 10.4 | 17 | 4.6 | 15.2 |
| 49.4 | 15 | 32.5 | 17.83 |
| 85.3 | 11.5 | 69 | 9.11 |
| 133 | 18.7 | 121 | 16.6 |
| 196 | 12.21 | 234 | 16.1 |
| 329 | 25.7 | 655.9 | 25 |
| $\sigma = 1.187$ | | $\sigma = 1.65$ | |

$$\left( \frac{\sum_{1}^{n} (\ln \eta_i)^2 \cdot \omega_i - (\ln \bar{\eta})^2}{100} \right)^{\frac{1}{2}}$$

$\omega_i$ = % by weight of the distilled fraction
$\eta_i$ = kinematic viscosity at 20° C. in cSt of fraction i
$n_i$ = distilled fractions (i varies from 1 to 6)

$\ln \bar{\eta} = \sum_{1}^{n} \omega_i \cdot \ln \eta_i$.

We claim:
1. A process for the dissociation of perfluoropolyethers obtained from photo-oxidation processes of perfluoroolefins or by anionic polymerization of their epoxides which comprises heating the perfluoropolyether to a temperature from 150° to 380° C. in the presence of 0.1–10% by weight of catalysts comprising:

oxides of the following metals:

Ti, Cr, Mn, Fe, Co, Ni, V, Cu, Mo, Sn, Sb, Zr, Zn;

or fluorides and oxyfluorides of:

Co, Mn, Fe, Cu, Mo, Sn, Sb, Zr, Zn.

2. The process of claim 1, wherein the fluoride or oxyfluoride is prepared in situ by reaction with fluorine of the halides or oxyhalides of the metals defined in claim 1.

3. The process of claim 1, wherein perfluoropolyether is neutralized before being subjected to the dissociation process.

4. Perfluoropolyethers prepared according to the process of claim 1.

5. The scission process of claim 1, characterized in that temperature and pressure in the scission reactor are adjusted at such a value as to maintain the reaction mixture boiling, and the distillate is subjected to fractionation in a column in order to obtain at the top a distillate having the predetermined molecular weight, while the fraction having a higher molecular weight is recycled to the dissociation reactor.

6. Process, according to claim 5 in which the catalyst used for the scission is selected from fluoride or oxyfluorides of the metals indicated in claim 1.

* * * * *